United States Patent [19]
Martinez

[11] 4,148,459
[45] Apr. 10, 1979

[54] QUICK DISCONNECT VALVED COUPLING

[76] Inventor: Ginez Martinez, 153 Rue Anatole, 93130 Noisy Le Sec, France

[21] Appl. No.: 811,885

[22] Filed: Jun. 30, 1977

[30] Foreign Application Priority Data
Oct. 4, 1976 [FR] France .................. 76 29785

[51] Int. Cl.² .......................................... F16L 37/28
[52] U.S. Cl. ................... 251/149.6; 285/277; 285/316
[58] Field of Search .................. 251/149.6; 285/316, 285/277

[56] References Cited
U.S. PATENT DOCUMENTS

| 2,935,338 | 5/1960 | Mills, Jr. | 285/277 X |
| 3,032,359 | 5/1962 | Cator | 285/316 X |
| 3,359,015 | 12/1967 | Zahuranec | 285/316 X |
| 3,567,175 | 3/1971 | Sciuto, Jr. | 251/149.6 |
| 4,060,298 | 11/1977 | Gearin | 285/DIG. 14 X |

Primary Examiner—William R. Cline
Attorney, Agent, or Firm—Cushman, Darby & Cushman

[57] ABSTRACT

A quick disconnect coupling of the self-locking type which enables easier connection and prevents stresses to be developed into an unsupported rigid or flexible hose connected to the male or the female portion of the coupling. The male portion of this coupling includes a stopper which cooperates with a mating end of a sliding collar used to retain locking balls into the female portion during the introduction of the male portion into the female portion, said stopper and said mating end or said locking collar allowing, once the male portion is fully engaged into the female portion, the locking collar to return to its initial position.

4 Claims, 6 Drawing Figures

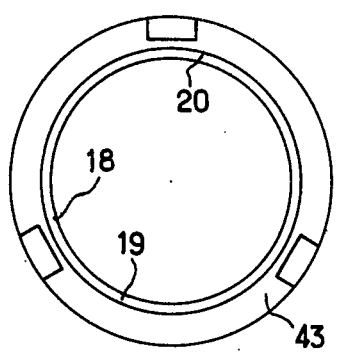
Fig: 3
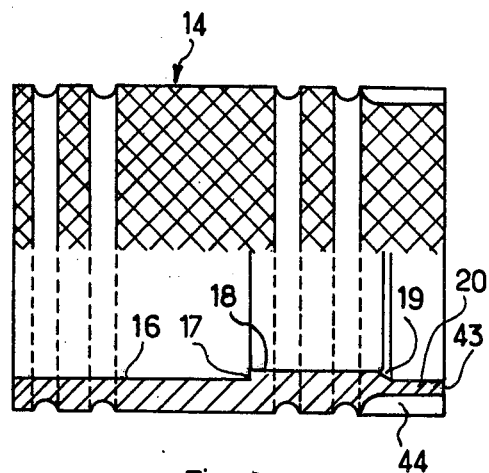
Fig: 2
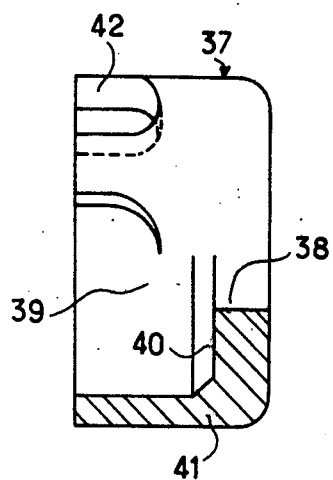
Fig: 4
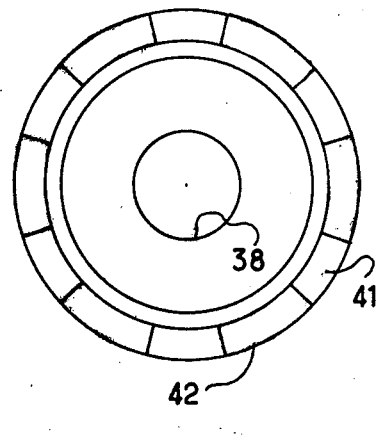
Fig: 5
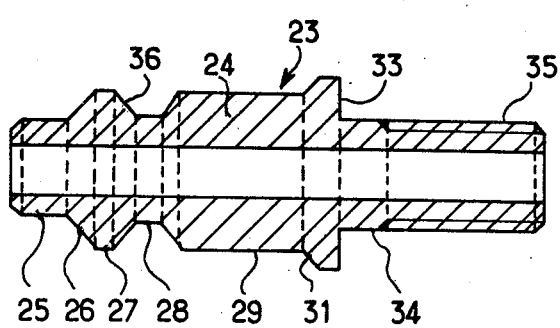
Fig: 6

QUICK DISCONNECT VALVED COUPLING

BACKGROUND OF THE INVENTION

1. Field of the Invention

The present invention relates to a quick disconnect coupling used for connecting pipes and, more particularly to a quick disconnect coupling of the self-locking type.

2. Description of the Prior Art

The interlocking action in a quick disconnect coupling is commonly provided by a set of balls annularly disposed and received with a suitable clearance into recesses, provided in a cylindrical sleeve of the female portion, said balls cooperating with a groove of the male portion, the side faces of which forming ramps, so that when the male portion is introduced into the female portion, said balls are first moved radially towards the outside by a ramp of said groove of the male portion, and are then resiliently urged into a groove having a suitable contour formed into the peripheral surface of the male portion.

In such a type of quick disconnect coupling, the radial movement of the balls is generally controlled by a surrounding collar slidably received onto said sleeve containing the balls therein, said collar being formed with a ramp which connects two axial bores of different diameters formed into said collar, so that in a first position of said collar, the bore having the smaller diameter surrounds the recesses where the balls are received and prevents said balls to move radially towards the outside, and in a second position of said collar, the bore having the larger diameter surrounds the recesses where the balls are received, thus permitting the balls to move radially towards the outside, the ramp connecting said two bores acting, to move the balls back towards the centre of the female portion.

The radial movement of said balls is thus controlled by an axial movement of the locking collar.

This collar is generally biased by a strong compression spring which tends to press the collar against a shoulder counterbored into said cylindrical sleeve. In this first position of said collar, or nonoperative position, the bore having the smaller diameter in said collar surrounds the balls so that they are maintained in their retracted or inner position.

Therefore, a quick disconnect coupling of the above type is operated as follows:

- the locking collar is slid to its unlocking position and maintained in this position while introducing the male portion into the female portion. When said male portion is fully introduced into the female portion, the locking collar can be released, the return spring moving same back to its first or rest position, thus locking the balls and hence the male portion into the female portion.

The female portion, which supports the locking collar is generally connected to a nonsupported flexible pipe or hose so that when the quick disconnect coupling has to be connected, the following problem arises:

- the male portion being held in one hand, the female portion being held in the other hand, simultaneously, the moving part of the female portion, i.e. the locking collar, must be slid as above mentionned while the rest of the coupling must be held stationary with said other hand. For small size couplings this sliding action of the collar is generally achieved with two or three fingers. But, for larger size couplings, the locking operation becomes all the more difficult as the collar return spring is generally very strong.

The result of this difficult handling for connection is that, in most instances, a part of the effort applied on the locking collar is transmitted to the pipe which is connected to the female portion of the coupling, thus causing stresses in the pipe connection and resulting in pipe failure or shearing.

This problem is further aggravated when a quick disconnect coupling fitted with a check valve is being used, that is when the pipe connected to the female portion is under pressure. In this case, in addition to the efforts normally applied to the female portion of the coupling, must be added the force to be exerted by the male portion to lift the check valve, and eventually to move the corresponding seal, to overcome the forces created by the fluid under pressure and the check valve return spring.

OBJECT OF THE INVENTION

It is an object of the present invention to provide a quick disconnect coupling of the self locking type which overcomes the above disadvantages.

It is an other object of the invention to provide a quick disconnect coupling into which the movement of the locking collar is controlled by the male portion during its penetration into the female portion.

SUMMARY OF THE INVENTION

To achieve this object and according to a feature of the invention, in such a quick disconnect coupling, the male portion includes a pushing member designed to cooperate with a mating end of the sliding locking collar of the female portion during the introduction of the male portion into the female portion According to an other feature of the invention, said pushing member comprises a cylindrical member having an annular end, the front annulus of which being formed with longitudinal notches circumferentially spaced, said mating end of said sliding locking collar being also formed with corresponding longitudinal grooves circumferentially spaced.

With the quick disconnect coupling of this invention, it is only necessary to hold firmly with one hand a stationary part of the female portion, for example, the connecting part thereof, connected to the pipe and to present, with the other hand, the male portion in opposition to the female portion so that the pushing member of said male portion cooperates with the mating end of the locking collar, said locking collar sliding back upon introduction of the male portion into the female portion and the locking collar being allowed to come back to its rest position once the introduction of the male portion is completed.

In a quick disconnect coupling according to this invention, each portion of the coupling is firmly held in each respective hand of an operator, the locking action being achieved only by pushing these two portions axially into each other.

It appears that with the quick disconnect coupling of this invention, the shearing efforts or stresses induced between the pipes and the connection members of both male and female portions of the coupling are greatly reduced if not eliminated.

Such a type of quick disconnect coupling has a further advantage in that said pushing member, as it cooperates with the sliding locking collar ensures, when the coupling is connected and locked, an improved protection of the junction plane between the external surfaces of the male and female portions.

BRIEF DESCRIPTION OF THE DRAWINGS

The invention will be described by way of example with reference to the accompanying drawings in which:

FIG. 2 is an elevation view of a locking sliding collar according to a peferred embodiment of the invention.

FIG. 3 is a front view of the collar of FIG. 2.

FIG. 4 is a half elevational and half sectional view of a pushing member according to a preferred embodiment of the present invention adapted to cooperate with the collar of FIG. 2.

FIG. 5 is a front view of the pushing member of FIG. 4 and,

FIG. 6 is a connector according to the invention designed to receive the pushing member of FIGS. 4 and 5.

DETAILED DESCRIPTION OF THE DRAWINGS

Figure 1:
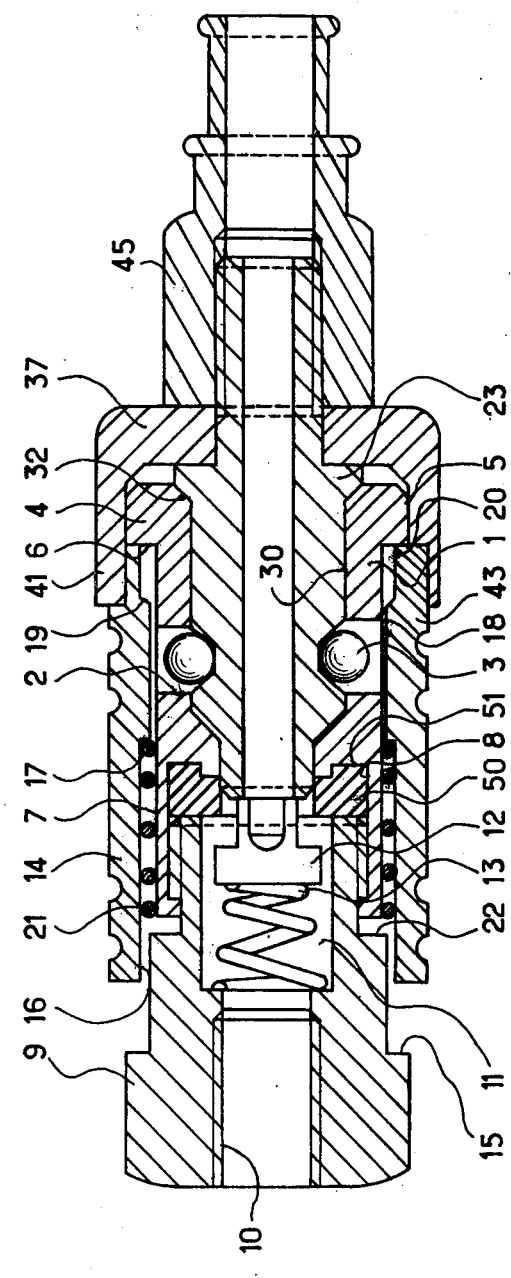
FIG. 1 is a schematic elevational view in longitudinal section of a quick disconnect coupling according to the invention, in the interlocked position.

Referring to FIG. 1, the quick disconnect coupling of the invention includes a cylindrical sleeve 1 provided with radial recesses 2 circularly spaced and adapted for receiving balls 3. These recesses are slightly crimped so that the balls can move radially by a slight amount without being able to escape from said recesses. One end of sleeve 1 is formed with an enlarged annular portion 4 having an external engagement surface 5 and a shoulder 6 connecting with the external cylindrical surface 7 of sleeve 1. The other end of said sleeve 1 is formed with a tapped bore 8 to receive the threaded end of a hollow connector or fitting 9 This connector is provided at its other end with a connection means such as a tapped bore 10 for connection of the female portion of the quick disconnect coupling to a pipe member provided, for example, with an external thread. The tapped bore 10 extends in a bore 11, into which a check valve 12 and a check valve return spring 13 are received. The check valve 12 cooperates with an annular seal 50 mounted in the recess 8 and engaging with an annular surface 51 formed on the sleeve 1 of the female portion.

A locking collar 14 is fitted with a suitable clearance around the sleeve 1 and its longitudinal movement is limited in one direction by said shoulder 6 of the enlarged annular portion 4 of said sleeve 1 and in the other direction, by a shoulder 15 formed in the connector 9. The collar 14 is formed internally with a first cylindrical surface 16 extending through a shoulder 17 in a second cylindrical surface 18 having a diameter slightly smaller than that of said surface 16 and slightly larger than the external diameter of said sleeve 1, said second surface 18 extending into another cylindrical surface 20 through an inclined ramp 19, the diameter of the cylindrical surface 20 being larger than that of surface 18. A helical compression spring 21 is positionned between the cylindrical surface 16 of the locking collar and the cylindrical outer surface 7 of sleeve 1. The spring 21 is retained between the shoulder 17 of said locking sleeve 14 and a shoulder 22 formed into said connector part 9. It can be seen, therefore, that in the position shown in FIG. 1, the balls 3 are prevented from moving radially towards the outside by the cylindrical surface 18 of the locking collar 14; on the contrary, when the locking collar is moved towards the left against the spring 21, the cylindrical surface 20 overlies the annularly disposed balls permitting same to move radially towards the outside.

Referring to FIGS. 1 and 6, the male portion or nipple, generally designated 23, includes, as is well known, a cylindrical hollow shank portion 24 formed externally, successively, with a cylindrical end 25, a ramp 26, a narrow cylindrical portion 27 of a larger diameter than that of the cylindrical end 25 and a groove 28 having a wide bottom, substantially of the same diameter as said cylindrical end 25, the side faces of this groove being conical in order to act as ramps and cooperate with balls 3 contained in sleeve 1. Said shank portion extends in a cylindrical portion 29 which is externally machined to cooperate with a receiving bore 30 formed in sleeve 1. This cylindrical portion 29 extends through a frusto conical section 31 in a larger portion ending at a shoulder 33 which connects with a cylindrical portion 34 ending in a threaded portion 35. The frusto conical portion is designed to cooperate with a chamfer 32 formed at the outer end of said receiving bore 30 in said sleeve for positioning the shank portion of the nipple in engagement with said sleeves, the groove 28 being thus aligned with the axis of said recesses 2 wherein the balls 3 are contained. It will be understood that, during its introduction into the female portion, and providing that said locking collar 14 has been moved towards the left against the spring 21, the ramp 26 will move the balls 3 towards the outside, then, with this axial movement being continued, the end of the nipple 23 will lift the check valve 12 against the action of return spring 13 and said groove 28 comes in line with and underneath the recesses 2; thus, when the locking collar 14 is released, the ramp 19 pushes the balls back towards the centre of said sleeve engaging them partially inside groove 28, thus preventing the disengagement of the nipple 23 from the sleeve 1, the cylindrical surface 17 of said locking collar 14 preventing the balls 3 to move radially out of the groove under the action of the side portion 36 of the groove 28.

According to the present invention, the cylindrical portion 34 of said male portion or nipple 23 is designed to fit into a bore 38 formed in a pushing member or stopper 37 having generally the shape of a hollow cylinder formed with a counterbore 39 at one end, the diameter of which being larger than that of the bore 38 and designed to slidably receive the cylindrical engagement surface 5 of said sleeve 1 into said pushing member 37. When the male portion of the coupling is received within the female portion, the front annular surface 40 of said pushing member 37 connecting the bores 38 and 39 engages with the shoulder 33 of shank 24. The pushing member 37 is fixedly supported onto the male portion 23 by a suitable fastening member screwed onto the thread 35. The annular portion 41 which surrounds the bore 39 in said pushing member 37 is formed with longitudinal notches 42 which are circularly spaced on the periphery of said annular portion 41.

The annulus 43 which defines the cylindrical portion 20 of said locking collar 14 is also formed with longitudinal grooves 44 circularly spaced on the periphery of of the annular portion 43 so that, when the front faces of the annular portions 41 and 43 are brought in contact in proper registration, the pushing member 37 can, upon the axial movement of the male portion into the female portion, move said collar 14 back against the spring 21 and, when the male portion is fully engaged into the female portion, a slight relative rotation of said collar 14 or pushing member 37 with respect to each other will bring the notches or the grooves, respectively, of one member in correspondence with the protrusions defined therebetween in the other member; the collar 14 can then move back to its rest position against the shoulder 6 under the action of the return spring 21 thus locking the male portion into the female portion.

The unlocking operation is done in the usual way, as follows:
- with the hand grasping the external surface, (preferably knurled or serrated) of locking collar 14; said collar 14 is then moved against the spring 21 to enable the balls 3 to disengage from the groove of the male portion, thus permitting the male portion to be withdrawn, the ramp 36 formed as one of the side faces of the groove 28 urging the balls 3 towards the outside and permitting the shank 24 to be disengaged from said sleeve 1.

As a fastening member to secure the stopper 37 onto said shank 24, a connector 45 for a flexible hose has been shown on FIG. 1, this connector being formed with two stepped diameters, but it will be readily understood that any fitting or connector internally tapped so as to match with threads 35 and provided at its other end with suitable means for connection to any type of pipes, rigid, threaded, or hoses can be used.

Instead of the slot arrangement which permits the cooperation of the stopper 37 and the collar 14, any other arrangement can be used which, after the locking collar 14 has been moved backwards, allows it to come back to its rest position, such as, for example, a bayonet or ramp arrangement. In addition, without departing from the scope of the invention, the female portion of the quick disconnect coupling can be provided with a locking arrangement different from the embodiment described herein, providing the locking device uses a sliding locking collar of the type of the collar 14. A different connector part 9 can also be used provided with connecting means different from the tapped bore 10, in order to be connected to any type of pipe members.

It is to be understood that the forgoing description is that of a preferred embodiment of the invention. Various changes and modifications may be made without departing from the spirit and the scope of the invention as defined by the appended claims.

What is claimed is:
1. A quick disconnect coupling of the self-locking type which comprises:
   a female portion, including a hollow body having a main longitudinal axis and defining a transversing stepped fluid passage having at one end an inlet opening for receiving a male portion, said body having adjacent said inlet opening a radially outwardly extending flange, said body having radial recesses for receiving a plurality of retaining balls;
   a sliding cylindrical ring surrounding said body for selectively locking said balls within said recesses, said ring having an annular front end and being urged by a spring means, said ring being longitudinally movable between a first position against said spring means where it allows said balls to be radially outwardly displaced in said recess and a second position where, under the biasing force of said spring means, an inner portion of said annular front end comes into abutting contact with said radially outwardly extending flange of said body, so as to lock said balls against radial outward displacement in said recesses;
   a male portion comprising a hollow member having an outer surface, said hollow member defining a longitudinally extending fluid passage, said outer surface of said hollow member defining, successively, a straight cylindrical front end, a radially outwardly extending diverging ramp surface, and straight cylindrical surface having substantially the same diameter as said inlet opening in said body of said female portion, a V-shaped groove being formed in said cylindrical surface at a portion thereof adjacent said ramp surface for cooperation with said balls when said hollow member is inserted in said female portion;
   said male portion being further provided with a pushing element comprising a cylindrical member having an annular front end and an inner surface, which defines, with said cylindrical surface of said hollow member, an annular recess for receiving said radially outwardly extending flange of said body of said female portion when said hollow member is inserted within said female portion, said annular front end of said pushing element being adapted for selectively cooperating with said annular front end of said ring, each of said annular front ends being provided with angularly spaced recesses, so that recesses in one of said front ends may complementarily receive the cylindrical front end portions between said recesses in the other said front end, and vice-versa,
   whereby, when inserting said hollow member in said body of said female portion, said recesses in said front ends being not in complementary angular position, said pushing element pushes said ring against said biasing force of said spring means towards its said first position, thus allowing said balls to expand radially through contact engagement with said ramp surface and said hollow member to come into abutment against a stop surface formed in said body, after which, by causing a relative rotation of said pushing member or said ring to bring said annular front ends in complementary angular position, said ring, under said biasing force of said spring means, comes in its said second position for locking said retaining balls protruding inwardly in said V-shaped groove of said hollow member.

2. A quick disconnect coupling according to claim 1, wherein said hollow member includes an outer cylindrical bearing surface ending in an annular radially extending shoulder for engagement with said pushing member, said outer cylindrical bearing surface having a threaded end to receive a fastening member for securing said pushing element onto said hollow member.

3. A quick disconnect coupling according to claim 2, wherein said fastening member is a hollow member provided with a tapped bore at one end for cooperation with said threaded end of said hollow member and a connection means at the other end for connection with a pipe member.

4. A quick disconnect coupling according to claim 3, wherein said female portion further includes a check valve.

* * * * *